(12) United States Patent
Liang

(10) Patent No.: US 11,409,600 B2
(45) Date of Patent: Aug. 9, 2022

(54) INCREASED MEMORY ACCESS PARALLELISM USING PARITY

(71) Applicant: Micron Technology, Inc., Boise, ID (US)

(72) Inventor: Qing Liang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/136,863

(22) Filed: Dec. 29, 2020

(65) Prior Publication Data

US 2021/0200633 A1 Jul. 1, 2021

Related U.S. Application Data

(60) Provisional application No. 62/955,085, filed on Dec. 30, 2019.

(51) Int. Cl.
*G06F 11/10* (2006.01)
*G06F 12/1009* (2016.01)
*G06F 3/06* (2006.01)

(52) U.S. Cl.
CPC ........ *G06F 11/1068* (2013.01); *G06F 3/0619* (2013.01); *G06F 3/0659* (2013.01); *G06F 3/0679* (2013.01); *G06F 12/1009* (2013.01); *G06F 2212/657* (2013.01)

(58) Field of Classification Search
CPC .. G06F 11/1068; G06F 3/0619; G06F 3/0659; G06F 3/0679; G06F 12/1009; G06F 2212/657
See application file for complete search history.

(56) References Cited

U.S. PATENT DOCUMENTS

2018/0129600 A1* 5/2018 Ishiyama ............ G06F 11/1076
2020/0020398 A1* 1/2020 Miller .................... G06F 3/0653
2020/0135280 A1* 4/2020 Hu ......................... G06F 3/0619

* cited by examiner

*Primary Examiner* — Kyle Vallecillo
(74) *Attorney, Agent, or Firm* — Schwegman Lundberg & Woessner, P.A.

(57) ABSTRACT

Disclosed in some examples are memory devices which increase a parallelism of host operations of a memory device. While a first block of data from a first stripe in a first memory die is being read, blocks of data belonging to a second stripe stored in memory dies other than the first memory die are concurrently read. This includes reading the parity value of the second stripe. The parity data, along with the blocks of data from the second stripe from dies other than the first die are then used to determine the block of data of the second stripe stored in the first memory die without actually reading the value from the block in the first memory die. This reconstruction may be done in parallel with additional read operations for other data performed on the first die.

22 Claims, 11 Drawing Sheets

| | DIE 0 | | DIE 1 | | DIE 2 | | DIE 3 | |
|---|---|---|---|---|---|---|---|---|
| | PLANE 0 | PLANE 1 | PLANE 0 | PLANE 1 | PLANE 0 | PLANE 1 | PLANE 0 | PLANE 1 |
| PAGE 0 | 1 | 2 | 3 | 4 | 5 | 6 | PARITY 00 | PARITY 01 |
| PAGE 1 | 7 | 8 | 9 | 10 | 11 | 12 | PARITY 10 | PARITY 11 |
| PAGE 2 | 13 | 14 | 15 | 16 | 17 | 18 | PARITY 20 | PARITY 21 |
| PAGE 3 | 19 | 20 | 21 | 22 | 23 | 24 | PARITY 30 | PARITY 31 |

INCREASED MEMORY ACCESS PARALLELISM USING PARITY

PRIORITY APPLICATION

This application claims the benefit of priority to U.S. Provisional Application Ser. No. 62/955,085, filed Dec. 30, 2019, which is incorporated herein by reference in its entirety.

Embodiments described herein generally relate to systems and methods for increasing memory access parallelism for faster memory read operations.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), in various forms, such as dynamic random-access memory (DRAM) or synchronous dynamic random-access memory (SDRAM), among others. Non-volatile memory may retain stored data when not powered (may be implemented as read-only memory (ROM) in some cases) and may include one or more storage technologies, such as flash memory (e.g., NAND or NOR flash), electrically erasable programmable ROM (EEPROM), static RAM (SRAM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others. Systems incorporating memory may include multiple memory devices or memory systems implementing multiple storage technologies.

Flash memory is utilized as non-volatile memory for a wide range of electronic applications. Flash memory devices typically include one or more groups of one-transistor, floating gate, or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

A flash memory controller for managed NAND (MNAND) devices (e.g., Universal Flash Storage (UFS™) devices, an embedded MMC device (eMMC™), etc.) generally implement a static random-access memory (SRAM) for holding a logical to physical (L2P) translation table (also known as a page table) for translating virtual memory addresses to physical memory addresses during a memory access. However, SRAMs are typically of a limited size that may not hold the entire logical to physical (L2P) translation table. For example, a typical SRAM may hold on the order of 2 MB of data, while the entire L2P translation table may hold 128 MB of data. In some embodiments, the flash memory controller may implement an L2P cache that holds on the order of 128 kB to hold the addresses of frequently accessed L2P nodes, which is only a small partition of the whole L2P translation table. In any such configurations, fast access to the stored data is desired to improve the efficiency of memory read operations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates storage of data in a memory array that has implemented parity to protect the integrity of the stored data according to some examples of the present disclosure.

DETAILED DESCRIPTION

Figure 1:
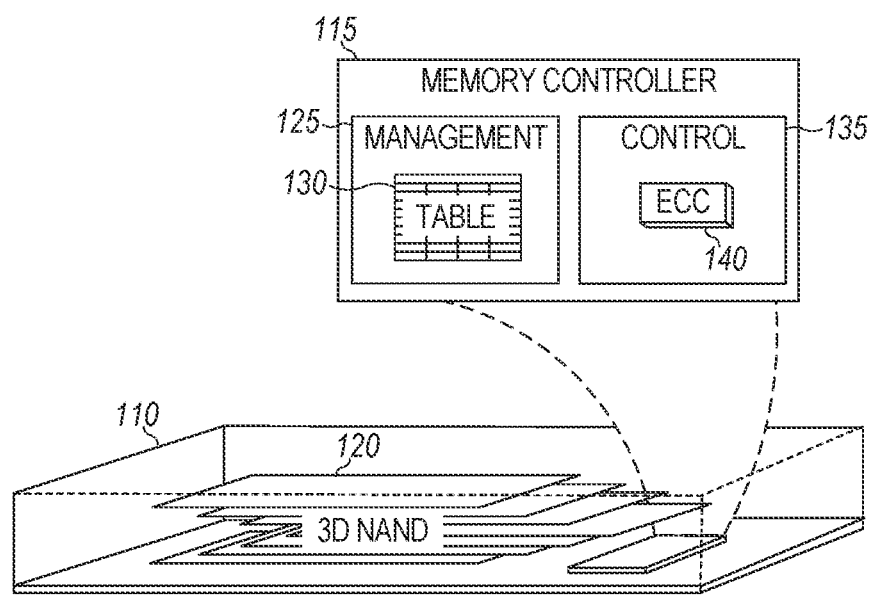
FIG. 1 illustrates an example of an environment including a memory device according to some examples of the present disclosure.

Flash memory devices may organize the memory cells of the device into a plurality of dies, each die having one or more planes and each plane having one or more pages. A memory device may store data striped across multiple dies. For example, a first portion of data may be stored on a first die and a second portion of data may be stored on a second die. In addition, a parity value may be stored on a third die. For example, if the parity value is an XOR value of the first and second portions, then loss of either (but not both) of the first and second portions is recoverable using the non-lost portion and the parity data. This storage scheme may allow for increased redundancy for the data as loss of a single die would not render the data stored therein to be unrecoverable. This increased redundancy may be useful for important data such as the L2P translation table. As used herein a stripe is composed of multiple data values, wherein each data value is written to different portions of the memory device (e.g., across different dies). A stripe may have a corresponding parity value that allows for the reconstruction of one of the data values given the other data values and the parity value.

Flash memory devices may be limited to reading one data portion (e.g., page) at a time from a same die, but may read data portions from different dies concurrently. That is, a memory device may read a first value in a first die concurrently with a second value in a second die. Disclosed in some examples are methods, systems, machine-readable mediums, and memory devices which increase a parallelism of a read operation on a memory device by utilizing both striping and parity. While a first block of data from a first stripe in a first memory die is being read, blocks of data belonging to a second stripe stored in memory dies other than the first memory die are concurrently read. This includes reading the parity value of the second stripe. The parity data, along with the blocks of data from the second stripe from dies other than the first die are then used to determine the block of data of the second stripe stored in the first memory die without actually reading the value from the block in the first memory die. This reconstruction may be done in parallel with additional read operations for other data performed on the first die, thus three reads may be performed on the first die in approximately the span that two reads is normally performed. In this manner, the data readout bandwidth may be increased without necessarily changing the read/write speed of the memory array.

Memory Device

In the embodiments described herein, the memory devices include individual memory die, which may, for example, include including a storage region comprising one or more arrays of memory cells implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality may simplify interoperability with an external device, such as a "host" as discussed later herein. In such managed memory devices, the controller functionality may be implemented on one or more die also incorporating a memory array or on a separate die. In other examples, one or more memory devices may be combined with controller functionality to form a solid-state drive (SSD) storage volume. The term "memory system," is used herein as inclusive of one or more memory die, and any controller functionality for such memory die, when present; and thus includes individual memory devices, managed memory devices, and SSDs.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

NAND flash architecture semiconductor memory arrays are accessed through decoders that activate specific memory cells by selecting the word line coupled to their gates. In such NAND memory arrays, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each NAND flash memory cell may be programmed individually or collectively to one or a number of programmed states. For example, a single-level cell (SLC) may represent one of two programmed states (e.g., 1 or 0), representing one bit of data. Flash memory cells may also represent more than two programmed states, allowing the manufacture of higher density memories without increasing the number of memory cells, as each cell may represent more than one binary digit (e.g., more than one bit). Such cells may be referred to as multi-state memory cells, multi-digit cells, or multi-level cells (MLCs). In certain examples, MLC may refer to a memory cell that may store two bits of data per cell (e.g., one of four programmed states), a triple-level cell (TLC) may refer to a memory cell that may store three bits of data per cell (e.g., one of eight programmed states), and a quad-level cell (QLC) may store four bits of data per cell. MLC is used herein in its broader context, to refer to any memory cell(s) that may store more than one bit of data per cell (i.e., that may represent more than two programmed states).

Managed memory devices may be configured and operated in accordance with recognized industry standards. For example, managed NAND devices may be (as non-limiting examples), a Universal Flash Storage (UFS™) device, an embedded MMC device (eMMC™), or the like. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1," and/or updates or subsequent versions to such standard. The identified standards are provided only as example environments in which the described methods and structures may be utilized. Such methods and structures may be utilized in a variety of environments outside of the identified standards (or of any other actual or proposed standards), except as expressly indicated herein.

An SSD may be used as, among other things, the main storage device of a computer, having advantages over traditional hard drives with moving parts with respect to, for example, performance, size, weight, ruggedness, operating temperature range, and power consumption. For example, SSDs may have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

Both SSDs and managed memory devices may include a number of memory devices, including a number of dies or logical units (e.g., logical unit numbers or LUNs), and may include one or more processors or other controllers performing logic functions required to operate the memory devices or interface with external systems. Such SSDs and managed memory devices may include one or more flash memory die, including a number of memory arrays and peripheral circuitry thereon. The flash memory arrays may include a number of blocks of memory cells organized into a number of physical pages. In some examples, the SSDs may also include DRAM or SRAM (or other forms of memory die or other memory structures). Similarly, managed NAND devices may include one or more arrays of volatile and/or nonvolatile memory separate from the NAND storage array, and either within or separate from a controller. Both SSDs and managed NAND devices may receive commands from a host in association with memory operations, such as read or write operations to transfer data (e.g., user data and associated integrity data, such as error data and address data, etc.) between the memory devices and the host, or erase operations to erase data from the memory devices.

In the following detailed description, reference is made to the accompanying drawings that form a part hereof and in which is shown, by way of illustration, specific embodiments. In the drawings, like numerals describe substantially similar components throughout the several views. Other embodiments may be utilized, and structural, logical, and electrical changes may be made without departing from the scope of the present disclosure. The following detailed description is, therefore, not to be taken in a limiting sense.

Although embodiments are discussed in this document with reference to NAND media, the embodiments are not limited to NAND media and may be applied to NOR media. Furthermore, although embodiments are discussed primarily in reference to managed NAND devices, the described embodiments may alternatively be implemented with other types of non-volatile storage technologies such as nanowire memory, Ferro-electric random access memory (FeRAM), magnetoresistive random access memory (MRAM), flash memory, Spin Torque Transfer Random Access Memory (STTRAM), Resistive Random Access Memory (RRAM), byte addressable 3-Dimensional Cross Point Memory (3D X-Point), PCM (Phase Change Memory), etc.

FIG. 1 illustrates an example of a memory device 110 that may be included in a variety of products, such as Internet of Things (IoT) devices (e.g., a refrigerator or other appliance, sensor, motor or actuator, mobile communication device, automobile, drone, etc.) to support processing, communications, or control of a product. The memory device 110 includes a memory controller 115 and a memory array 120. The memory array 120 may include a number of individual memory die (e.g., a two-dimensional (2D) NAND die, or a stack of three-dimensional (3D) NAND die). The memory arrays 120 may be 2D structures arranged on a surface of a semiconductor substrate. To increase memory capacity for a given area, and to decrease cost, the size of the individual memory cells has decreased. Alternatively, memory arrays 120 may be 3D structures, such as 3D NAND memory devices that may further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs may include one or more field-effect transistors (FETs) or metal-oxide semiconductor (MOS) structure devices, etc. In some examples, the strings will extend vertically, through multiple vertically spaced tiers containing respective word lines. A semiconductor structure may extend adjacent a string of storage cells to form a channel for the storage cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

In 3D architecture semiconductor memory technology, vertical structures are stacked, increasing the number of tiers, physical pages, and accordingly, the density of a memory device (e.g., a storage device). In an example, the memory device 110 may be a discrete memory or storage device component of a host device. In other examples, the memory device 110 may be a portion of an integrated circuit (e.g., system on a chip (SOC), etc.), stacked or otherwise included with one or more other components of a host device.

The memory controller 115 may receive instructions from the host 105 and may communicate with the memory array 120, such as to transfer data to (e.g., write or erase) or from (e.g., read) one or more of the memory cells, planes, sub-blocks, blocks, or pages of the memory array. The memory controller 115 includes processing circuitry, which may include one or more processors which, when present, operate to execute instructions stored in the memory device. For purposes of the present examples, the instructions will be discussed as firmware, though instructions may also be present as software; and all or some portion of the described functions may also be implemented in circuitry including one or more components or integrated circuits. In some examples, the functions of memory controller 115 are implemented by a processor executing the instructions of firmware which in some examples would be stored within the memory controller 115. In other examples, one or more processors within memory controller 115, may execute instructions stored in the memory array 120. Similarly, the management tables 130 can be stored on the memory controller 115 or in memory array 120. In such examples the instructions and/or management tables 130 may be stored in certain blocks of the NAND die of memory array 120 and loaded into the working memory of memory controller 115 during operation.

The memory controller 115 may be configured (e.g., hardware and/or software implementation) to perform the methods described herein, including the exemplary methods described below with reference to FIGS. 5-9. For example, the memory controller 115 may store instructions for performing the memory read and address translation methods described herein. In sample embodiments, the instructions may be included in firmware or in software implemented by a processor of the memory controller 115. For example, the memory controller 115 may include one or more memory control units, circuits, or components configured to control access across the memory array 120 and to provide a translation layer between a host and the memory device 110. The memory controller 115 may include one or more input/output (I/O) circuits, lines, or interfaces to transfer data to or from the memory array 120. The memory controller 115 also may include a memory manager 125 and an array controller 135.

The memory manager 125 may include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 may parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 may include a set of management tables 130 configured to maintain various information associated with one or more components of the memory device 110 (e.g., various information associated with a memory array or one or more memory cells coupled to the memory controller 115). For example, the management tables 130 may include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error may be referred to as an uncorrectable bit error. The management tables 130 may maintain a count of correctable or uncorrectable bit errors, among other things.

The array controller 135 may include, among other things, circuitry or components configured to control memory operations associated with writing data to, reading data from, car erasing one or more memory cells of the memory device 110 coupled to the memory controller 115. The array controller 135 may include an error correction code (ECC) component 140, which may include, among other things, an ECC engine or other circuitry configured to detect or correct errors associated with writing data to or reading data from one or more memory cells of the memory device 110 coupled to the memory controller 115. The memory controller 115 may be configured to actively detect and recover from error occurrences (e.g., bit errors, operation errors, etc.) associated with various operations or storage of data, while maintaining integrity of the data transferred between a host and the memory device 110, or maintaining integrity of stored data (e.g., using redundant RAID storage, etc.), and may remove (e.g., retire) failing memory resources (e.g., memory cells, memory arrays, pages, blocks, etc.) to prevent future errors.

In some examples, the memory array may comprise a number of NAND dies and one or more functions of the memory controller 115 for a particular NAND die may be implemented by an on-die controller on that particular die. Other organizations and delineations of control functionality may also be utilized, such as a controller for each die, plane, superblock, block, page, and the like.

The memory array 120 may include several memory cells arranged in, for example, a number of devices, semi-conductor dies, planes, sub-blocks, blocks, or pages. In operation, data is typically written to or read from the NAND memory device 110 in pages and erased in blocks. However, one or more memory operations (e.g., read, write, erase, etc.) may be performed on larger or smaller groups of memory cells, as desired. The data transfer size of a NAND memory device 110 is typically referred to as a page; whereas the data transfer size of a host is typically referred to as a sector.

Although a page of data may include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 may provide for different page sizes or may require different amounts of metadata associated therewith. For example, different memory device types may have different bit error rates, which may lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
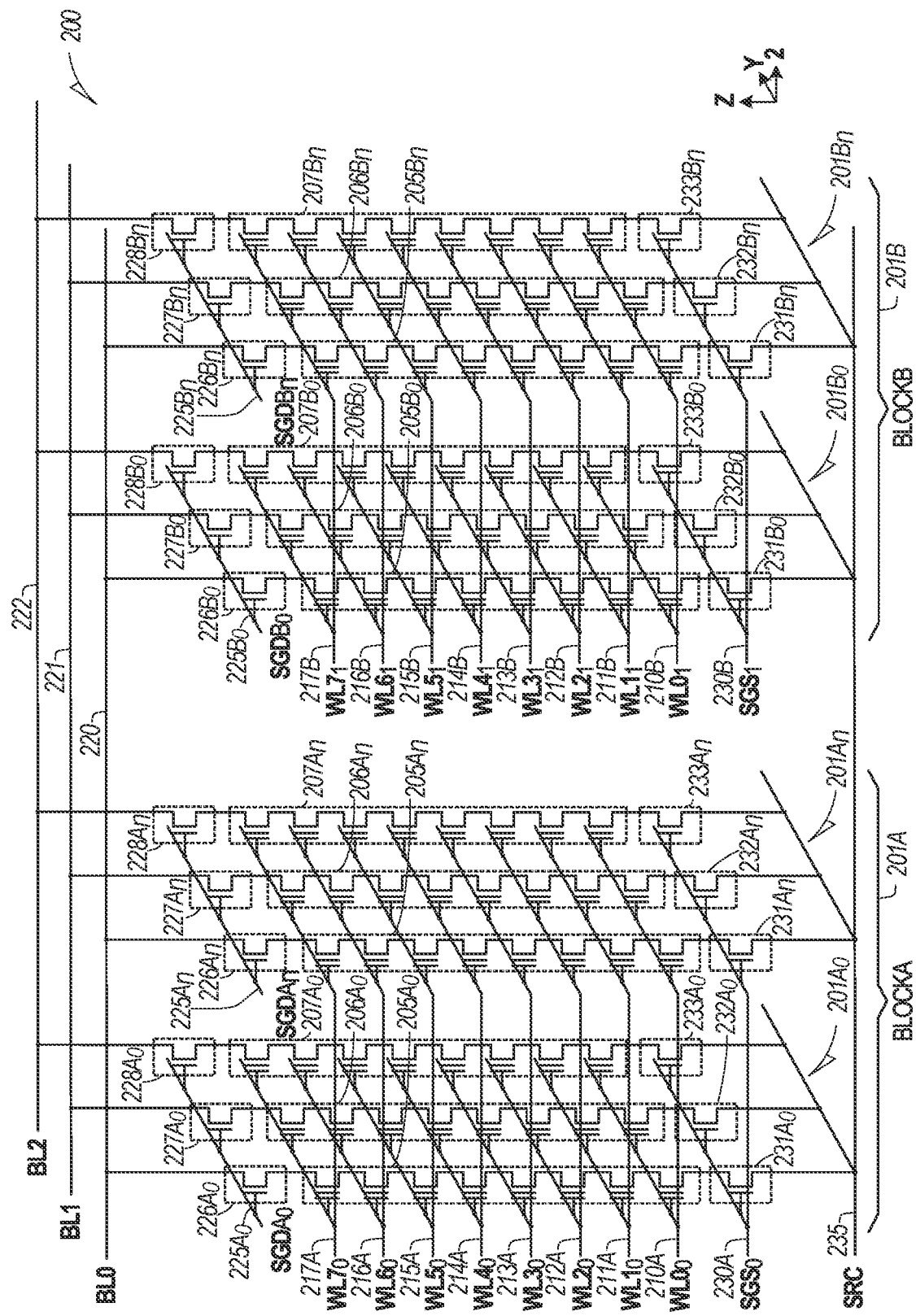
FIGS. 2-3 are schematic diagrams illustrating examples of a NAND architecture semiconductor memory array according to some examples of the present disclosure.

FIG. 2 is a schematic diagram illustrating an example of a 3D NAND architecture semiconductor memory array 200 of a NAND memory device 110 of the type illustrated in FIG. 1, including a number of strings of memory cells (e.g., first-third A0 memory strings 205A0-207A0, first-third An memory strings 205An-207An, first-third B0 memory strings 205B0-207B0, first-third Bn memory strings 205Bn-207Bn, etc.), organized in blocks (e.g., block A 201A, block B 201B, etc.) and sub-blocks (e.g., sub-block A0 201A0, sub-block An 201An, sub-block B0 201B0, sub-block Bn 201Bn, etc.). The memory array 200 represents a portion of a greater number of similar structures that would typically be found in a block, device, or other unit of a memory device 110.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third A0 SGS 231A0-233A0, first-third An SGS 231An-233An, first-third B0 SGS 231B0-233B0, first-third Bn SGS 231Bn-233Bn, etc.) and a drain-side select gate (SGD) (e.g., first-third A0 SGD 226A0-228A0, first-third An SGD 226An-228An, first-third B0 SGD 226B0-228B0, first-third Bn SGD 226Bn-228Bn, etc.). Each string of memory cells in the 3D memory array may be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block may include one or more physical pages. A block may include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 may include more or fewer blocks, sub-blocks, physical pages, strings of memory cells, memory cells, or tiers. For example, each string of memory cells may include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device may include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) WL0₀-WL7₀ 210A-217A, WL0₁-WL7₁ 210B-217B, etc.), which collectively couples the control gates (CGs) across a specific tier, or a portion of a tier, as desired. Specific tiers in the 3D memory array, and accordingly, specific memory cells in a string, may be accessed or controlled using respective access lines. Groups of select gates may be accessed using various select lines.

For example, first-third A0 SGD 226A0-228A0 may be accessed using an A0 SGD line SGDAO 225A0, first-third An SGD 226An-228An may be accessed using an SGD line SGDAn 225An, first-third B0 SGD 226B0-228B0 may be accessed using a B0 SGD line SGDB0 225B0, and first-third Bn SGD 226Bn-228Bn may be accessed using a Bn SGD line SGDBn 225Bn. First-third A0 SGS 231A0-233A0 and first-third An SGS 231An-233An may be accessed using a gate select line SGS0 230A, and first-third B0 SGS 231B0-233B0 and first-third Bn SGS 231Bn-233Bn may be accessed via a gate select line SGS1 230B.

In an example, the memory array 200 may include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array may be accessed, selected, or controlled using a combination of bit lines (BLs) and select gates, etc., and specific memory cells at one or more tiers in the specific strings may be accessed, selected, or controlled using one or more access lines (e.g., WLs).

Figure 3:
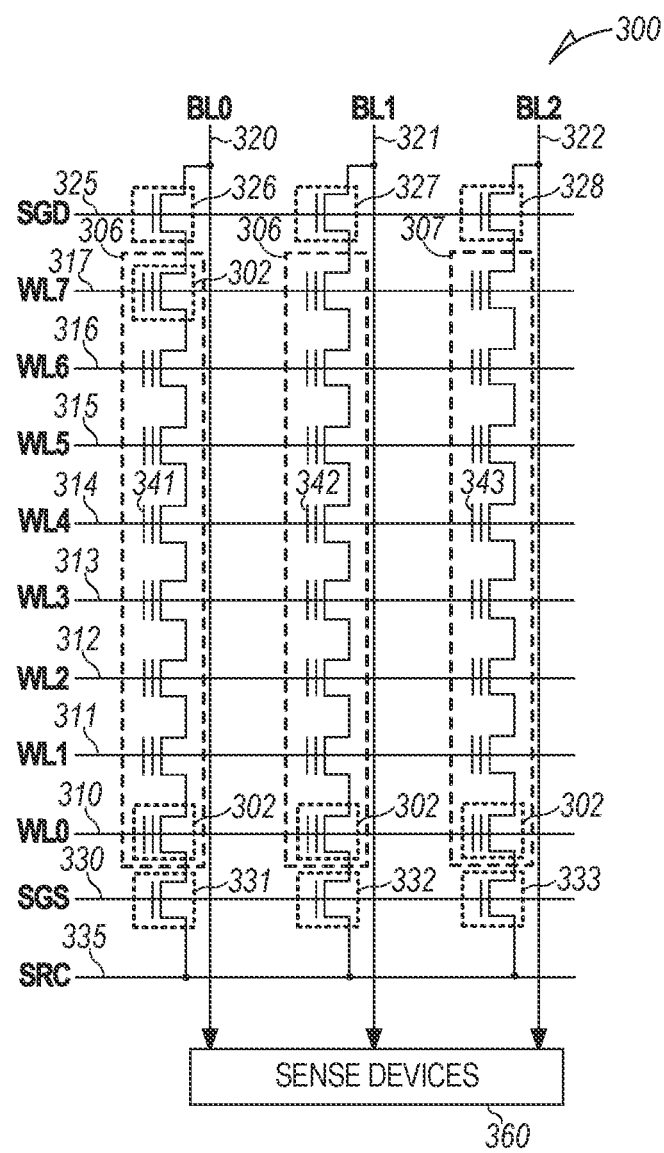

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 may illustrate an example schematic diagram of a portion of one physical page of memory cells of a 3D NAND architecture semiconductor memory device 200, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples may include strings of memory cells having more or fewer tiers or data lines, as desired.

In a NAND architecture semiconductor memory array, such as the example memory array 300, the state of a selected memory cell 302 may be accessed by sensing a current or voltage variation associated with a particular data line containing the selected memory cell. The memory array 300 may be accessed (e.g., by a control circuit, one or more processors, digital logic, etc.) using one or more drivers. In an example, one or more drivers may activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) may be applied to selected word lines (e.g., WL4), and thus, to a control gate of each memory cell coupled to the selected word lines (e.g., first-third control gates (CGs) 341-343 of the memory cells coupled to WL4). Programming pulses may begin, for example, at or near 15V, and, in certain examples, may increase in magnitude during each programming pulse application. While the program voltage is applied to the selected word lines, a potential, such as a ground potential Vss, may be applied to the data lines (e.g., bit lines) and substrates (and thus the channels, between the sources and drains) of the memory cells targeted for programming, resulting in a charge transfer (e.g., direct injection or Fowler-Nordheirn (FN) tunneling, etc.) from the channels to the floating gates of the targeted memory cells.

In contrast, a pass voltage (VPASS) may be applied to one or more word lines having memory cells that are not targeted for programming, or an inhibit voltage (e.g., Vcc may be applied to data lines (e.g., bit lines) having memory cells that are not targeted for programming, for example, to inhibit charge from being transferred from the channels to the floating gates of such non-targeted memory cells. The pass voltage may be variable, depending, for example, on the proximity of the applied pass voltages to a word line targeted for programming. The inhibit voltage may include a supply voltage (Vcc), such as a voltage from an external source or supply (e.g., a battery, an AC-to-DC converter, etc.), relative to a ground potential Vss.

As an example, if a programming voltage (e.g., 15V or more) is applied to a specific word line, such as WL4, a pass voltage of 10V may be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells may decrease. For example, where a programming voltage of 15V is applied to WL4, a pass voltage of 10V may be applied to WL3 and WL5, a pass voltage of 8V may be applied to WL2 and WL6, a pass voltage of 7V may be applied to WL1 and WL7, etc. In other examples, the pass voltages, or number of word lines, etc., may be higher or lower, or more or less.

The sense amplifiers 360, coupled to one or more of the data lines (e.g., first, second, or third bit lines (BL0-BL2) 320-322), may detect the state of each memory cell in respective data lines by sensing a voltage or current on a particular data line.

Between applications of one or more programming pulses (e.g., Vpgm), a verify operation may be performed to determine if a selected memory cell has reached its intended programmed state. If the selected memory cell has reached its intended programmed state, it may be inhibited from further programming. If the selected memory cell has not reached its intended programmed state, additional programming pulses may be applied. If the selected memory cell has not reached its intended programmed state after a particular number of programming pulses (e.g., a maximum number), the selected memory cell, or a string, block, or page associated with such selected memory cell, may be marked as defective.

To erase a memory cell or a group of memory cells (e.g., erasure is typically performed in blocks or sub-blocks), an erasure voltage (Vers) (e.g., typically Vpgm) may be applied to the substrates (and thus the channels, between the sources and drains) of the memory cells targeted for erasure (e.g., using one or more bit lines, select gates, etc.), while the word lines of the targeted memory cells are kept at a potential, such as a ground Vss, resulting in a charge transfer (e.g., direct injection or Fowler-Nordheim (FN) tunneling, etc.) from the floating gates of the targeted memory cells to the channels.

Figure 4:
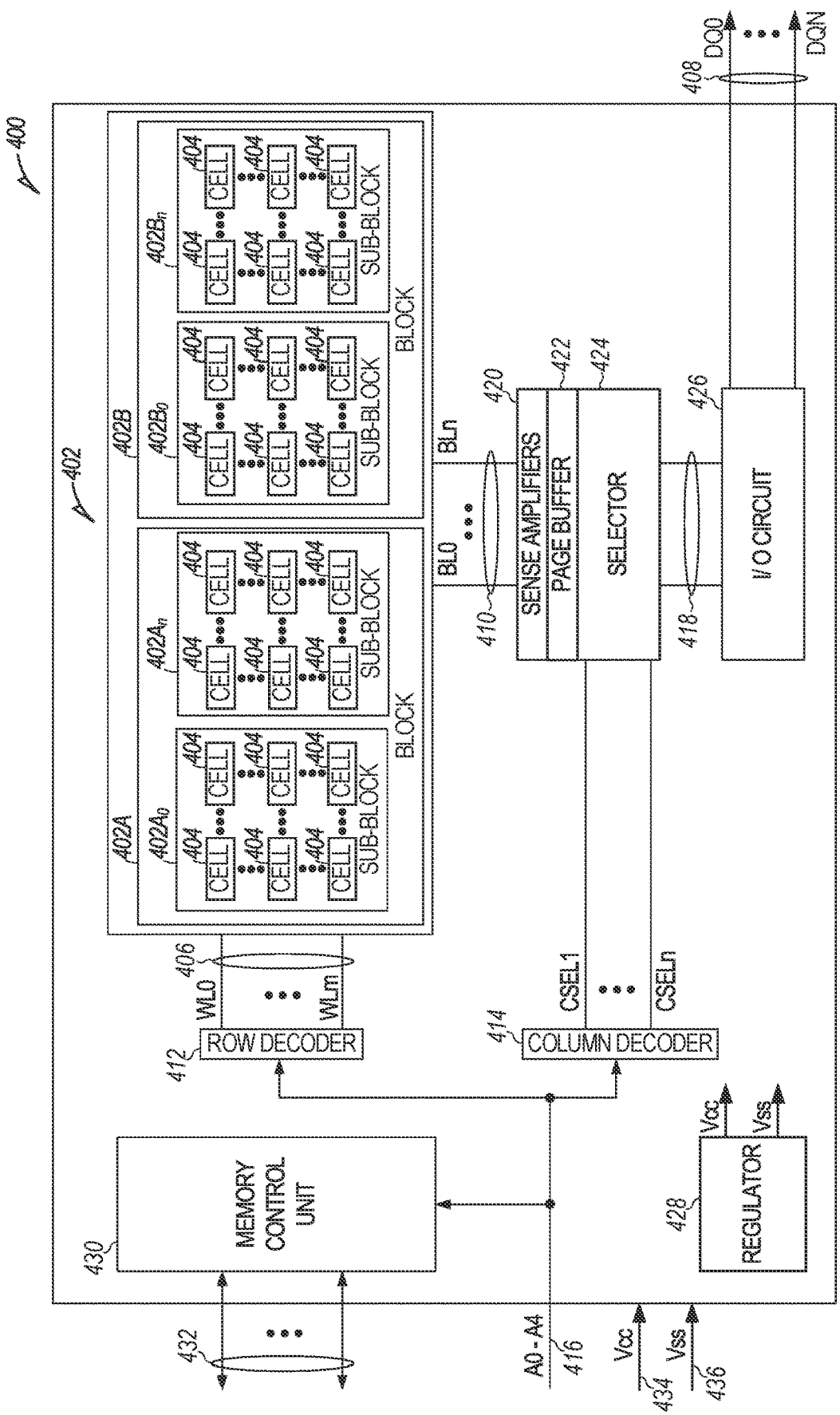
FIG. 4 is a block diagram illustrating an example of a memory module according to some examples of the present disclosure.

FIG. 4 is a block diagram illustrating an example of a memory device 400 of the type illustrated in FIG. 1, including a memory array 402 having a plurality of memory cells 404, and one or more circuits or components to provide communication with, or perform one or more memory operations on, the memory array 402. The memory device 400 may include a row decoder 412, a column decoder 414, sense amplifiers 420, a page buffer 422, a selector 424, an input/output (I/O) circuit 426, and a memory control unit 430.

The memory cells 404 of the memory array 402 may be arranged in blocks, such as first and second blocks 402A, 402B. Each block may include sub-blocks. For example, the first block 402A may include first and second sub-blocks 402A0, 402An, and the second block 402B may include first and second sub-blocks 402B0, 402Bn. Each sub-block may include a number of physical pages, each page including a number of memory cells 404. Although illustrated herein as having two blocks, each block having two sub-blocks, and each sub-block having a number of memory cells 404, in other examples, the memory array 402 may include more or fewer blocks, sub-blocks, memory cells, etc. In other examples, the memory cells 404 may be arranged in a number of rows, columns, pages, sub-blocks, blocks, etc., and accessed using, for example, access lines 406, first data lines 410, or one or more select gates, source lines, etc.

The memory control unit 430 may control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 may control the values of the control signals on the control lines 432, or the address signals on the address line 416. Examples of devices external to the memory device 400 may include, but are not limited to, a host, a memory controller, a processor, or one or more circuits or components not illustrated in FIG. 4.

The memory device 400 may use access lines 406 and first data lines 410 to transfer data to (e.g., write or erase) or from (e.g., read) one or more of the memory cells 404. The memory control unit 430 may include a state machine 431 coupled to the row decoder 412, the column decoder 414, and the I/O circuit 426. The state machine 413 may also output status data of the flash memory such as READY/BUSY or PASS/FAIL. In some designs, the state machine 431 may be configured to manage the programming process. The row decoder 412 and the column decoder 414 may receive and decode the address signals (A0-AX) from the address line 416, determine which of the memory cells 404 are to be accessed, and provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 may include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 may read a logic level in the selected memory cell 404 in response to a read current flowing in the memory array 402 through the selected string to the data lines 410.

One or more devices external to the memory device 400 may communicate with the memory device 400 using the I/O lines (DQ0-DQN) 408, address lines 416 (A0-AX), or control lines 432. The input/output (I/O) circuit 426 may transfer values of data in or out of the memory device 400, such as in or out of the page buffer 422 or the memory array 402, using the I/O lines 408, according to, for example, the control lines 432 and address lines 416. The page buffer 422 may store data received from the one or more devices external to the memory device 400 before the data is programmed into relevant portions of the memory array 402 or may store data read from the memory array 402 before the data is transmitted to the one or more devices external to the memory device 400.

The column decoder 414 may receive and decode address signals (A0-AX) into one or more column select signals (CSEL1-CSELn). The selector 424 (e.g., a select circuit) may receive the column select signals (CSEL1-CSELn) and select data in the page buffer 422 representing values of data to be read from or to be programmed into memory cells 404. Selected data may be transferred between the page buffer 422 and the I/O circuit 426 using second data lines 418. In some examples a flash translation layer (not shown) may map addresses provided by a host to physical memory addresses used by the row decoder 412 and column decoder 414 to read data in the memory array 402.

The memory control unit 430 may receive positive and negative supply signals, such as a supply voltage Vcc 434 and a ground potential Vss 436, from an external source or supply (e.g., an internal or external battery, an AC-to-DC converter, etc.). In certain examples, the memory control unit 430 may include a regulator 428 to internally provide positive or negative supply signals.

The present document describes examples of methods, systems, memory devices, and machine-readable media that uses parity data and striping to increase the bandwidth of read commands of managed NAND devices. As previously noted, in some examples, while a first block of data from a first stripe in a first memory die is being read, data portions from a second stripe stored in different memory dies are read in parallel, including a parity portion. The parity data is then used to reconstitute the portion of the second stripe stored in the first memory die without reading the first die. This reconstruction may happen in parallel with other reads of the first die. This process thus increases the data readout bandwidth without necessarily changing the read/write speed of the memory array.

Figure 5:
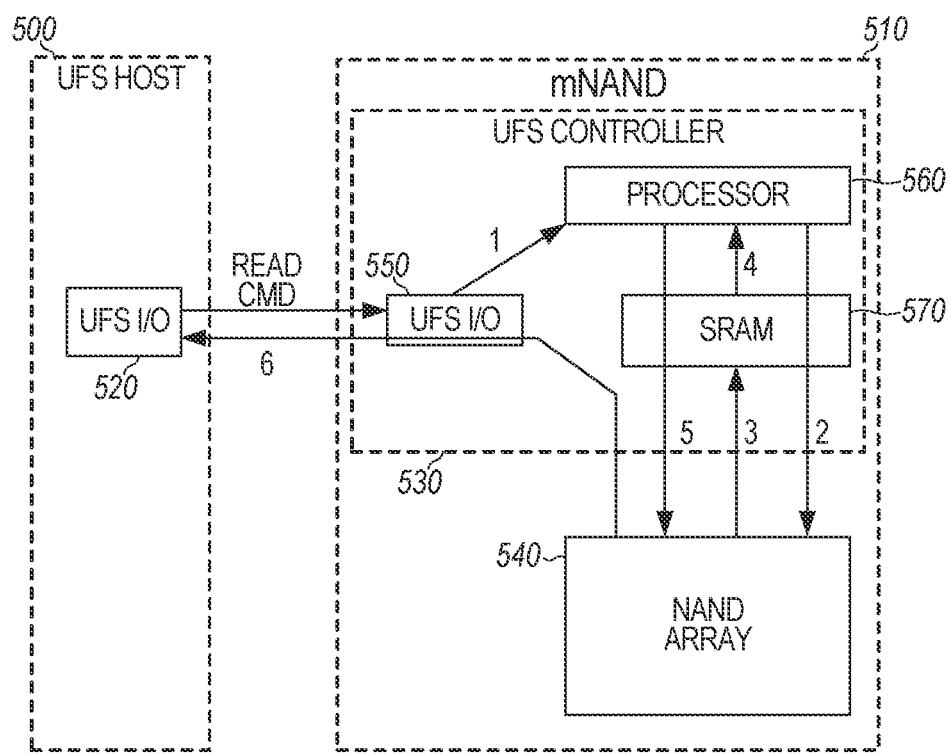
FIG. 5 illustrates a logical flow diagram of a read command sent from a host device to a NAND memory device according to some examples of the present disclosure

FIG. 5 illustrates the process of a read command from a host device to a NAND memory device of the type illustrated in FIG. 1 according to some examples of the present disclosure, Though described in the context of a UFS host system 100 communicating with a managed NAND device 110 via a UFS controller 120, it will be appreciated that the UFC devices are used for illustrative purposes only. It will be appreciated by those skilled in the art that the techniques described herein may be used with other type of managed memory devices.

As illustrated in FIG. 5, the host system 500 initiates a read from the managed NAND device 510 by issuing a read command (Read command) via the host system's I/O unit 520. In sample embodiments, the Read command references a virtual (logical) memory address that is to be translated by the memory controller 530 of the managed NAND device 510 into the physical memory address of the NAND memory 540. Upon receipt of the Read command with the logical memory address by the I/O unit 550 of the memory controller 530, the Read command is processed at (1) by the processor 560 to decode the logical block address (LBA) from the provided logical address to identify the physical address of the targeted host data stored in NAND 540 using a logical to physical (L2P) translation table.

The L2P translation table may be stored in, or partially stored in SRAM 570. Those skilled in the art will appreciate that the memory controllers 530 of memory devices may have an SRAM 570 of limited size that may not be able to hold the entire L2P translation table for translating the logical addresses to physical addresses. For example, the SRAM 570 may hold on the order of 2 MB while the entire L2P translation table may be on the order of 128 MB. To address this issue, the memory controller 530 may implement an L2P cache on the order of 128 KB that holds a portion of the L2P translation table, which is only a small portion of the entire L2P translation table. In addition, as a large SRAM 570 may be expensive, the entire L2P translation table may be stored in a portion of the NAND array 540. Upon receipt of a read command, if the logical address is not in the L2P cache, then at (2), the processor 560 dispatches a NAND Read command to get a portion of the L2P translation table from NAND 540 covering the identified logical address. The requested L2P data is transferred at (3) from the NAND 540 to the SRAM 570. At (4) the processor 560 may utilize the transferred portion of the L2P translation table in the SRAM 570 to determine the physical address corresponding to the logical address of the read command. In some examples, the transferred portion of the L2P translation table may be added to the L2P cache in the SRAM 570. An older portion of the L2P translation table that has not been recently accessed may be evicted from the cache to make room for the transferred portion.

The processor 560 then dispatches a NAND read command at (5) to get the host data located at the identified physical address of the NAND 540. The data payload at the identified physical address in the NAND 540 is then transferred at (6) from the NAND 540 to the I/O unit 550 of the memory controller 530 for transfer to the I/O unit 520 of the requesting host system 500.

In some examples, the L2P translation table stored in NAND 540 may be stored on the NAND 540 using the die striping methods as previously described along with parity bits. This may ensure that the L2P table is protected from die failures as the L2P table is important to the functioning of the memory device.

FIG. 6 illustrates the storage of data in a NAND array 600 according to some examples of the present disclosure. As illustrated, the data for each page 0-3 is stored in blocks across respective 2-plane dies 0-2. Parity data is stored in die 3 for protecting the integrity of the data stored in dies 0-2 in the event of failure of one of the dies 0-2. Of course, a 4-die/2-plane NAND memory plane 600 is just an example as NAND memory planes with different numbers of dies (e.g., 2, 4, or 8 dies are commonly used in mobile devices) or planes may also be used to implement the techniques described herein. Also, the techniques described herein may be used with any of the RAID configurations where the parity data is also distributed across the dies. Data is shown "striped" across multiple dies. Data for each stripe is shown within a same shape. That is, data portions 1, 3, and 5 are shown within a circle to denote that they are a same stripe. The parity for each of the stripes is stored in die 3. The parity stored in plane 0 of die 3 corresponds to the stripe stored in plane 0 of each die and the parity stored in plane 1 of die 3 corresponds to the stripe stored in plane 1 of each die. Thus, parity 00 is for the stripe with data portions 1, 3, 5 and parity 01 is for the stripe with data portions 2, 4, and 6.

As shown, the data in page 0 of the NAND memory plane 600 is "striped" across dies 0-2 by storing respective blocks of data 1, 3, and 5 of a first stripe and respective blocks of data 2, 4, 6 of a second stripe in planes 0 and 1 of die 1, in planes 0 and 1 of die 2, and in planes 0 and 1 of die 2, respectively. The parity data [00] for data blocks [1], [3], and [5] in plane 0 of the dies 0-2 is stored in plane 0 of die 3. Similarly, the parity data [01] for data blocks [2], [4], and [6] in plane 1 of the dies 0-2 is stored in plane 1 of die 3. Also, a third stripe of data is stored in page 1 by "striping" the data across dies 0-2 by storing respective blocks of data 7, 9, and 11 in planes 0 of die 0, die 1, and die 2 respectively. Similarly, a fourth stripe of data is stored in page 1 in die 0, plane 1, die 1, plane 1, die 2, plane 1. The parity data [10] for data blocks [7], [9], and [11] in plane 0 of the dies 0-2 is stored in plane 0 of die 3. Similarly, the parity data [11] for data blocks [8], [10], and [12] in plane 1 of the dies 0-2 is stored in plane 1 of die 3. Pages 2 and 3 have similarly striped data portions 13-24 and corresponding parity values in die 3.

In FIG. 6, it will be appreciated that a read request for data block [1] would be serviced by die 0. However, a simultaneous read request for data block [7] would have to wait since die 0 is busy reading data block [1]. However, a read request for data block [3] or data block [9] could be serviced concurrently by die 1. In operation, it is possible that multiple read requests for portions of the L2P translation table may be located on the same die on the same plane, which would block the parallelism of the L2P read, significantly impacting performance. For example, in the NAND memory plane 600 of FIG. 6, if 4 concurrent L2P read requests were made for data block [1], data block [7], data block [13], and data block [19], respectively, four cycles of NAND reads would be required due to the read conflicts at die 0. This limitation adversely affects the ability to read data out of the NAND memory plane 600 optimally. This limitation is addressed in sample embodiments by taking advantage of the parity data in die 3 and the data stored in other portions of the same stripe.

As noted above, parity data may be used to achieve redundancy. If a die in the memory array fails, remaining data on the other dies may be combined with the parity data (using the Boolean XOR function) to reconstruct the missing data. For example, suppose two dies in a three-die array contained the following data:

die 1: 01101101
die 2: 11010100

To calculate parity data for the two dies, an XOR is performed on their data:

$$\begin{array}{r} 01101101 \\ XOR\ 11010100 \\ \hline 10111001 \end{array}$$

The resulting parity data, 10111001, is then stored on die 3. Should any of the three dies fail, the contents of the failed die may be reconstructed on a replacement die by subjecting the data from the remaining dies to the same XOR operation. For example, if die 2 were to fail, its data could be rebuilt using the XOR results of the contents of the two remaining dies, die 1 and die 3:

Die 1: 01101101

Die 3: 10111001 as follows:

```
      10111001
XOR   01101101
      _____
      11010100
```

The result of that XOR calculation yields die 2's contents. 11010100 is then stored on die 2, fully repairing the array. This same XOR concept applies similarly to larger arrays, using any number of dies. For example, in the case of an array of 12 dies, 11 dies participate in the XOR calculation shown above and yield a value that is then stored on the dedicated parity drive.

As noted above, a memory die may only read one portion at a time. Thus, multiple concurrent read requests to the same memory die may lead to suboptimal performance. However, the inventor has recognized that the read bandwidth may be maximized by reading data from the memory dies in a sequence that minimizes memory conflict.

For example, with reference to FIG. 6, if a read request for data in data block [1], data block [7], data block [13], and data block [19] are received concurrently, the bandwidth may be maximized by reading the data in the following sequence. First, read die 0, plane 0, page 0 to get data portion [1]. Simultaneously, read data portion [9], data portion [11], and parity [10] from dies 1, 2, and 3 of page 1. Then, the data portion [1] may be transferred out of NAND 540 to SRAM 570. In the next cycle, data portions [9], [11], and parity [10] may be transferred from NAND dies 1, 2, and 3 to the SRAM 570 for performing an XOR operation on data portion [9], data portion [11], and parity [10] to reconstitute data portion [7]. While the processor 560 is performing the operation to reconstitute data portion [7], data portion [13] of page 2 may be read out of NAND die 0. Simultaneously, data portion [21], data portion [23], and parity [30] may be read from dies 1, 2, and 3 of page 3. Then, data portions [13] may be transferred out of NAND 540 to SRAM 570. In the next cycle, the data portion [21], data portion [23], and parity [30] may be transferred to the SRAM 570 for performing an XOR operation on data portion [21], data portion [23], and parity [30] to reconstitute portion [19] for transfer. As before, while processor 560 is performing the operation to reconstitute data portion [19], data may be read out of NAND die 0.

Figure 7:
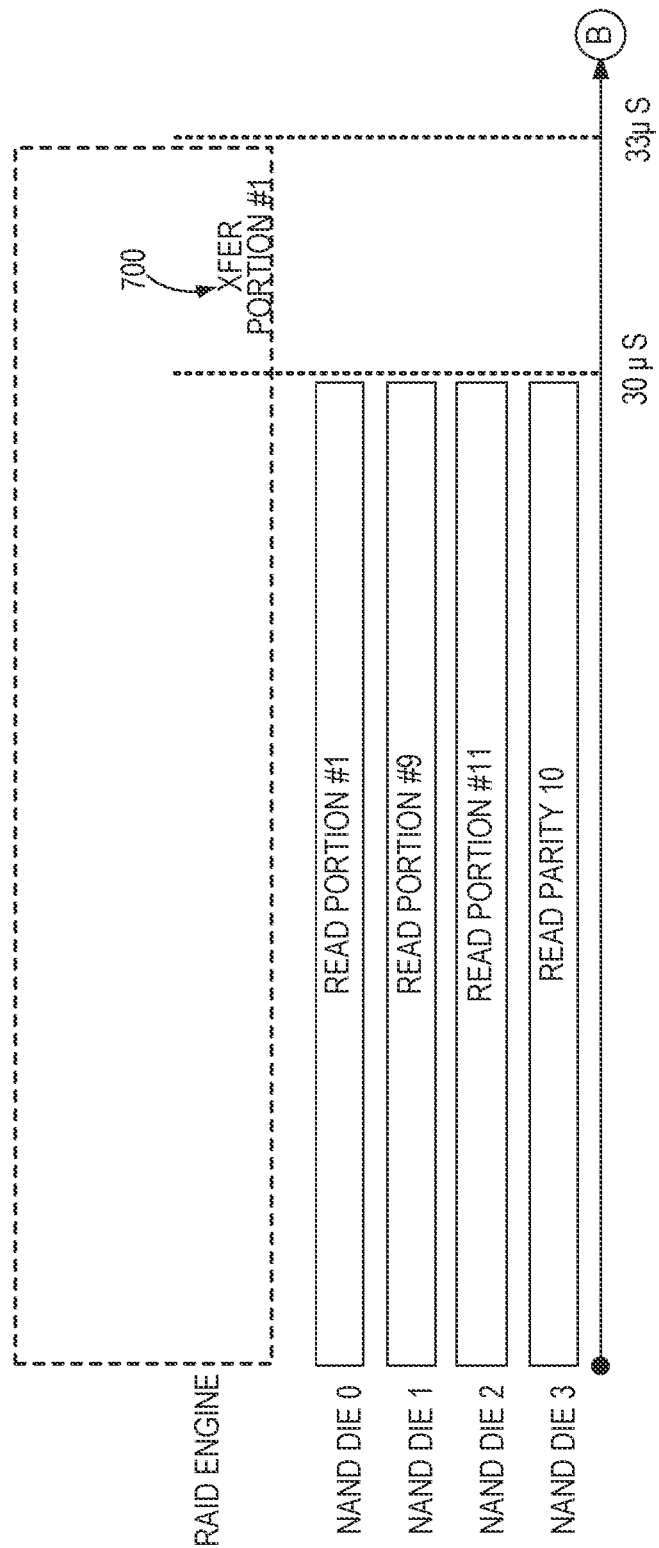
FIGS. 7-8 illustrate timing diagrams for accessing data in parallel according to some examples of the present disclosure.
Figure 8:
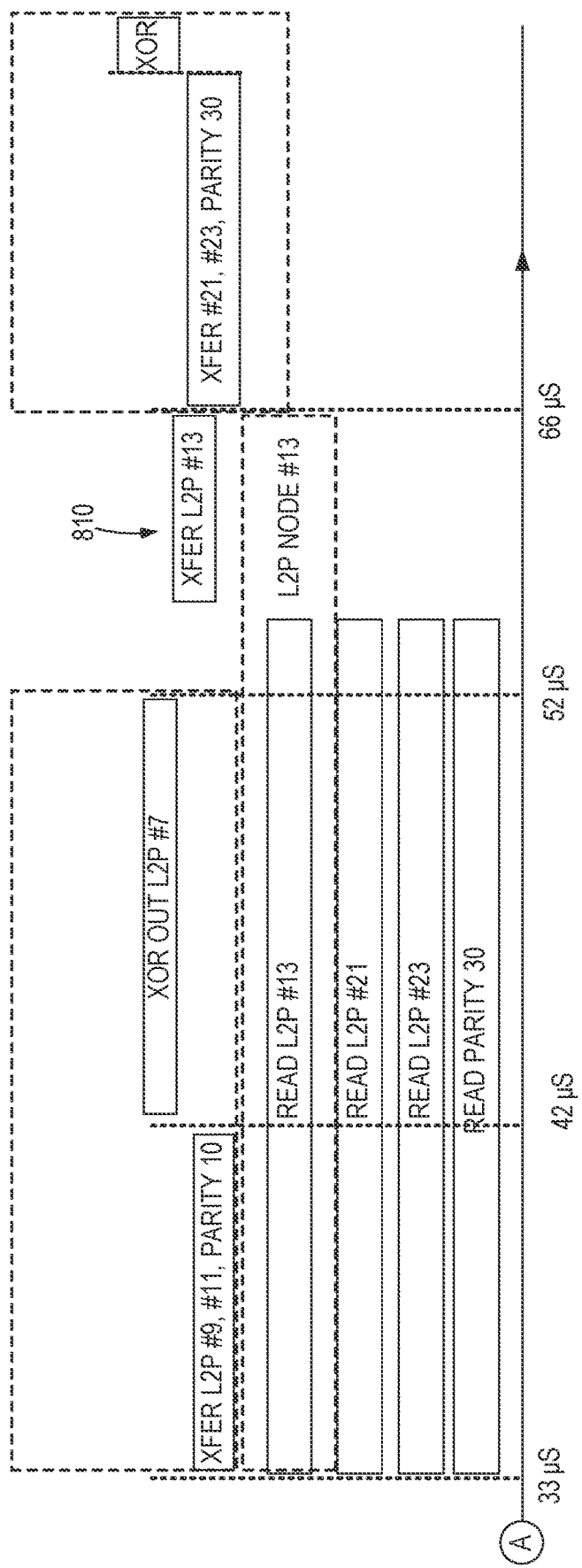

FIG. 7 illustrates a timing diagram for accessing data in parallel using parity data as described with respect to FIG. 7. As illustrated, in a sample embodiment, 33 μsec are allocated to a data block read for each die. Of course, the read time will vary from one memory device to another. In a first data read cycle, data portion [1] is read from NAND die 0, data portion [9] is read from NAND die 1, data portion [11] is ready from NAND die 2, and parity [10] is read from NAND die 3. The read data portion [1] from NAND die 0 is transferred at 700 to complete data portion #1. Turning now to FIG. 8, the timing diagram of FIG. 7 is continued. During a second data read cycle, data portion [13] of page 2 is read out of NAND die 0. Simultaneously, data portion [21] is read from NAND die 1, data portion [23] is read from NAND die 2, and parity [30] is read from NAND die 3. During this time, the data portion [9], data portion [11], and parity [10] read during the previous data read cycle are transferred into the SRAM 570 for performance of an XOR operation on data portion [9], data portion [11], and parity [10] to reconstitute data portion [7]. As illustrated, this process takes less time than the data read cycle of dies 0-3 and is performed in parallel with other read operations. The data portion [13] from NAND die 0 is transferred to the SRAM 570 at 810. During a third data read cycle, the data portion [21], data portion [23], and parity [30] read during the previous data read cycle is transferred into the SRAM 570 for performance of an XOR operation on data portion [21], data portion [23], and parity [30] to reconstitute data portion [19].

It will be appreciated that, in this example, the data portions [1], [7], [13], and [19] would be read out in 85 μsec (33 μsec+33 μsec+19 μsec) instead of 132 μsec (33 μsec×4) as required when the data portions [1], [7], [13], and [19] are read sequentially. Other planes of data may be simultaneously read using the same techniques. It will also be appreciated that this process speeds up the data readout by increasing the read bandwidth for read requests accessing the same NAND plane. For example, read requests for portions of the L2P translation table. The process is more efficient because it is faster to recreate data in a die using the XOR function than to perform an extra data read cycle.

While the above method is described with reference to L2P translation table data, it will be appreciated by one of ordinary skill in the art with the benefit of the present disclosure that the methods described are generally applicable to any data stored as described with the described parity bits. More generally, the method enables the memory device to skip an actual memory read operation by reconstituting the skipped data from the remaining data and parity bits. By skipping this memory read operation, other blocks of data may be read from that die—increasing parallelism.

Figure 9:
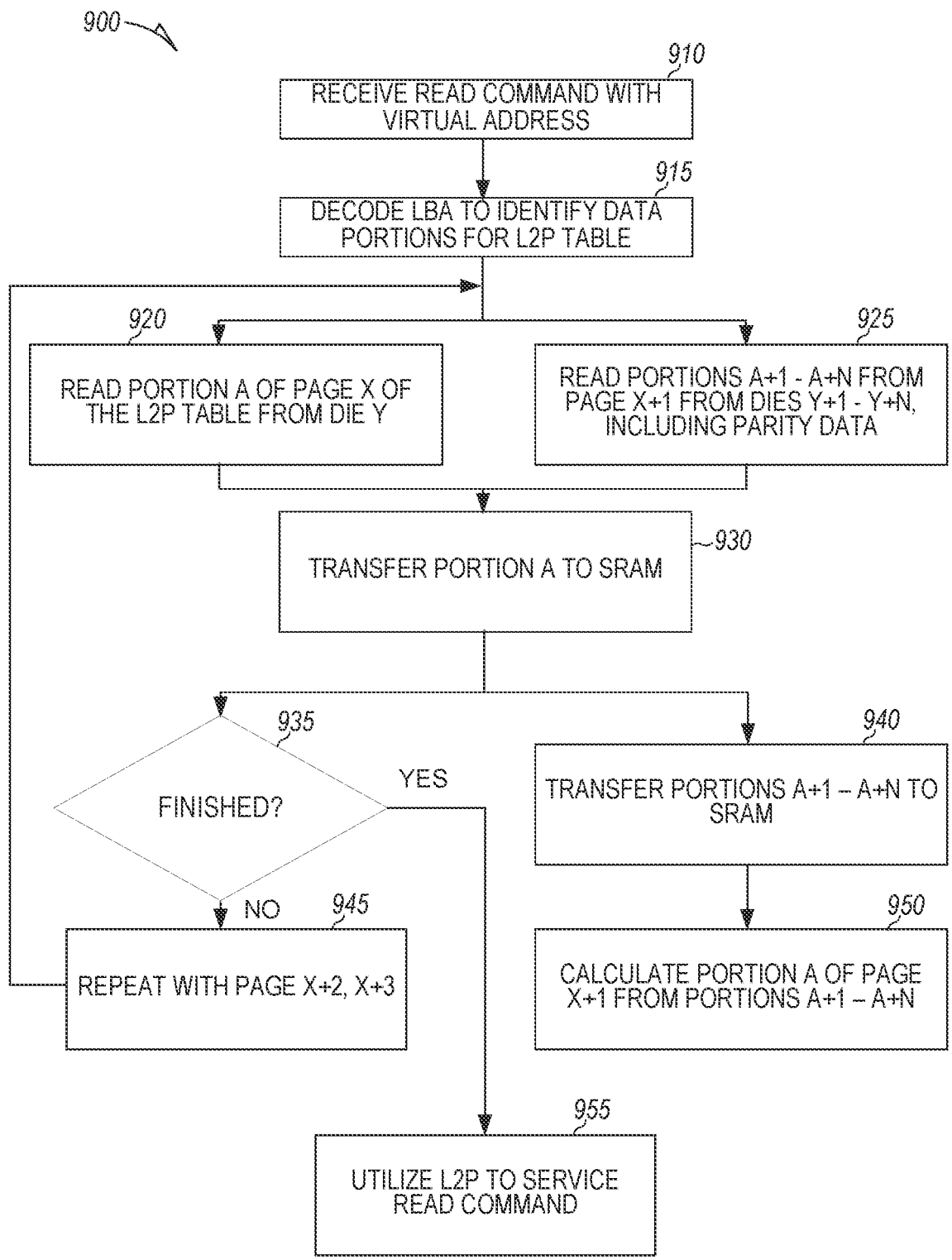
FIGS. 9-10 illustrate flow charts showing methods for reading data from a memory device according to some examples of the present disclosure.

FIG. 9 is a flow chart of a method 900 illustrating methods for reading data from a memory device according to some examples of the present disclosure. In the sample embodiments, the flow chart illustrated in FIG. 8 is implemented by the processor 560 of memory controller 530 of FIG. 5 to execute the read command received from the host system 500. At operation 910 the controller may receive a read command with a virtual address. At operation 915, the controller may decode the logical block address (LBA) to identify the portions of the LBA translation table needed to translate the logical block address to physical addresses of the memory array. If the portions of the LBA translation table needed are in the L2P cache, then the controller services the read with the physical address from the cache (not shown for clarity). On the other hand, if the portions of the LBA translation table are not in the L2P cache, then the controller reads the portions from the NAND memory array.

Operations 920 and 925 are caused to be performed simultaneously or near-simultaneously. At operation 920, a portion A of a page X of the L2P translation table is caused to be read from die Y. Simultaneously or concurrently portions, at 925, A+1-A+N from page X+1 from Dies Y+1-Y+N (including parity data) are read. The example of page X+1 is used as an example, however the simultaneous read can be of another page, and not sequential with page X. For purposes of the present example, portion A and page X will be a portion of a first stripe across multiple die in a multi-die array; and simultaneously read portions from page X+1 (or another page other than page X), will be a portion of a second stripe across multiple die in the multi-die array. As noted previously herein, the multiple die in the multi-die array can be multi-plane die. As discussed previously, relative to FIG. 6 portions in different planes of the individual die in the multi-die array may be included in different data stripes.

At operation 930 the portion A is transferred to SRAM. At operation 940, the system transfers portions A+1-A+N to the SRAM and at operations 950 calculates portion A of page X+1 from portions A+1-A+N (including the parity bits) for use in forming the segment of the L2P table. Simultaneously, the system determines if all portions have been read. If so, then at operation 955 the controller utilizes the segment of the L2P table represented by the above portions to service the read command. If there are additional data portions, the operations of 920, 925, 930, 935, 940, and 950 may be repeated for additional data until all L2P data portions have been read.

A portion, as used herein is any unit of data storage in the memory device, such as a page, a block, or the like. While the disclosed methods have, for example, read portion 1, while simultaneously read portions 9, 11, and parity 10 (e.g., in FIG. 6) and portions 9, 11, and parity 10 may be used to reconstruct portion 7, it will be appreciated by one of ordinary skill in the art with the benefit of the present disclosure that in other examples, other orderings may be used. For example, portion 3 may be read and simultaneously portion 7, 11 and parity 10 may be read to reconstruct portion 9.

Figure 10:
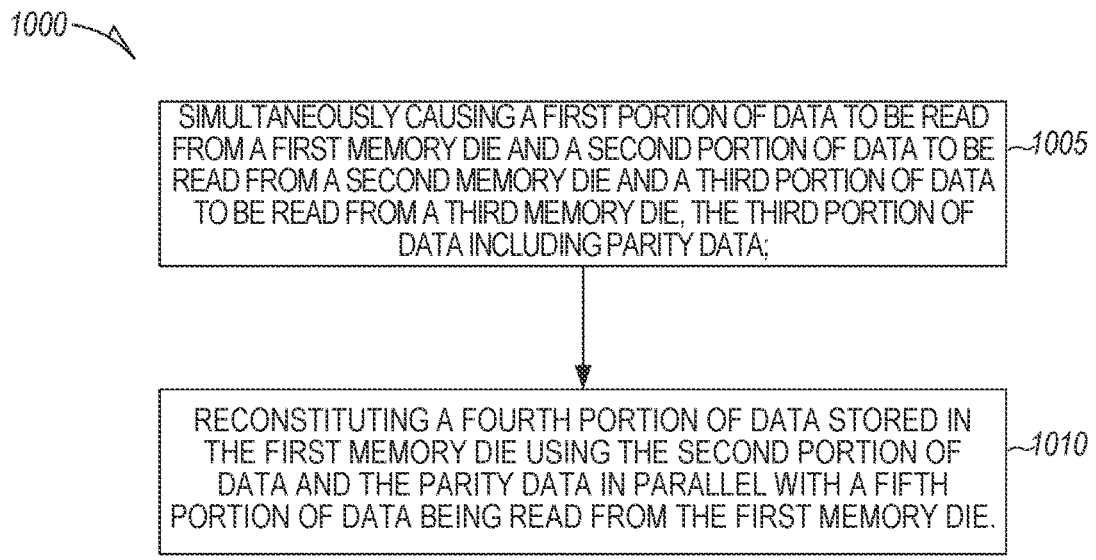

Turning now to FIG. 10 a flow chart of a method 1000 illustrating methods for reading data from a memory device according to some examples of the present disclosure. At operation the system may simultaneously cause a first portion of data to be read from a first memory die and a second portion of data to be read from a second memory die and a third portion of data to be read from a third memory die, the third portion of data including parity data. At operation 1010, the system may determine a fourth portion of data stored in the first memory die using the second portion of data and the parity data in parallel with a fifth portion of data being read from the first memory die. In some examples, sixth, and seventh portions from the second and third dies may be read simultaneously with operation 1010 and the sixth and seventh portions may be used to reconstruct an eighth portion stored in the first memory die without reading the first memory die. While FIG. 10 illustrates a configuration with three memory dies, as previously explained, additional memory dies may be included.

As noted above, this process effectively doubles the L2P read bandwidth for the condition of all L2P requests accessing the same NAND plane of the NAND 540. Also, while described in the context of reading L2P data from a NAND to an SRAM, it will be appreciated that the techniques described herein may be used for all types of data transfers for memory implementing RAID.

Figure 11:
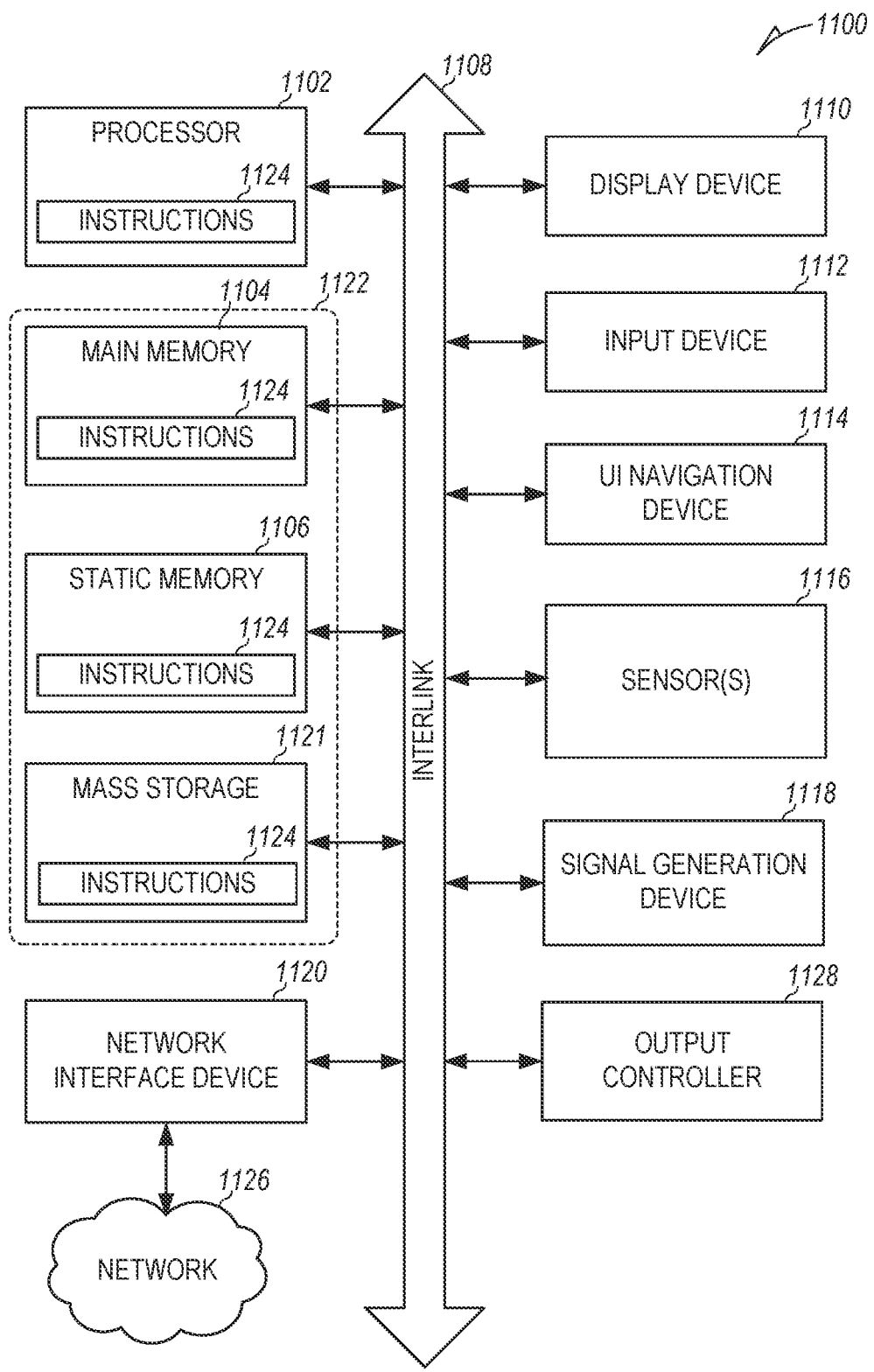
FIG. 11 is a block diagram illustrating an example of a machine upon which one or more embodiments disclosed herein may be implemented.

FIG. 11 illustrates a block diagram of an example machine 1100. Machine 1100 may be or be a portion of a host device, such as UFS host 500. In some examples, machine 1100, or one or more of the components of machine 1100 may be, or be incorporated into a memory device, such as MNAND 510. Machine 1100 may perform or implement one or more of the embodiments described herein, including FIGS. 1-10. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1100 may include a hardware processor 1102 (e.g., a central processing unit (CPU), a graphics processing unit (GPU), a hardware processor core, or any combination thereof, such as the memory controller 115, etc.), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine 1100 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine

1100. In an example, one or any combination of the hardware processor 1102, the main memory 1104, or the static memory 1106 may constitute the machine readable medium 1122.

While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any medium capable of storing or encoding instructions for execution by the machine 1100 and that cause the machine 1100 to perform any one or more of the techniques of the present disclosure, or capable of storing, encoding or carrying data structures used by or associated with such instructions. Non-limiting machine-readable medium examples include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 (e.g., software, programs, an operating system (OS), etc.) or other data are stored on the storage device 1121, may be accessed by the memory 1104 for use by the processor 1102. The memory 1104 (e.g., DRAM) is typically fast, but volatile, and thus a different type of storage than the storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the storage device 1121 may be allocated to supplement the memory 1104; however, because the storage 1121 device is typically slower than the memory 1104, and write speeds are typically at least twice as slow as read speeds, use of virtual memory may greatly reduce user experience due to storage device latency (in contrast to the memory 1104, e.g., DRAM). Further, use of the storage device 1121 for virtual memory may greatly reduce the usable lifespan of the storage device 1121.

In contrast to virtual memory, virtual memory compression (e.g., the Linux® kernel feature "ZRAM") uses part of the memory as compressed block storage to avoid paging to the storage device 1121. Paging takes place in the compressed block until it is necessary to write such data to the storage device 1121. Virtual memory compression increases the usable size of memory 1104, while reducing wear on the storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments in which the invention may be practiced. These embodiments are also referred to herein as "examples". Such examples may include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein may include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and may include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of controlling the read out of data from the memory device when implemented using RAID as described herein.

It will be understood that when an element is referred to as being "on," "connected to" or "coupled with" another element, it may be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements may be either be coupled, or directly coupled, unless otherwise indicated.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, the code may be tangibly stored on one or more volatile or non-volatile tangible computer-readable media, such as during execution or at other times. Examples of these tangible computer-readable media may include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim, Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

OTHER NOTES AND EXAMPLES

Example 1 is a method of reading data from a memory device comprising: simultaneously causing a first portion of data to be read from a first memory die and a second portion of data to be read from a second memory die and a third portion of data to be read from a third memory die, the third portion of data including parity data for data including the second portion of data and a fourth portion of data stored in the first memory die; and reconstituting the fourth portion of data stored in the first memory die using the second portion of data and the parity data in parallel with reading a fifth portion of data from a selected memory die.

In Example 2, the subject matter of Example 1 wherein: the first portion of data is part of a first stripe of data stored in a multi-die array of the memory device; the second, third, and fourth portions of data are part of a second stripe of data stored in the multi-die array of the memory device; and the fifth portion of data is part of a third stripe of data stored in the multi-die array of the memory device.

In Example 3, the subject matter of Example 2 wherein the fifth portion of data is read from the first memory device.

In Example 4, the subject matter of any one or more of Examples 2-3 wherein the memory dies of the multi-die array are multi-plane dies, and wherein each of the first, second, third, fourth, and fifth portions of data is in a respective plane of a respective die.

In Example 5, the subject matter of any one or more of Examples 1-4 optionally include P) translation table entries.

In Example 6, the subject matter of Example 5 optionally includes receiving a host command; determining that a L2P cache in a volatile memory of the memory device does not have an entry for a logical address included in the host command; and wherein causing the first portion, second portion, third portion, and fifth portions to be read is performed responsive to determining that the L2P cache in the volatile memory of the memory device does not have the entry for the logical address included in the host command.

In Example 7, the subject matter of Example 6 optionally includes translating the logical address included in the host command to a physical address using at least part of the first portion, second portion, third portion, fourth portion, or fifth portions; and causing execution of the host command on the physical address.

In Example 8, the subject matter of any one or more of Examples 5-7 optionally include receiving a host command; determining that a L2P cache in a volatile memory of the memory device does not have an entry for a logical address included in the host command; determining that reading the entry for the logical address included in the host command includes reading at least two portions of data stored in a same die; and wherein the causing the first portion, second portion, third portion, and fifth portions to be read, and reconstituting the fourth portion is performed responsive to determining that reading the entry for the logical address included in the host command includes reading at least two portions of data stored in the same die.

In Example 9, the subject matter of any one or more of Examples 1-8 wherein reconstituting the fourth portion of data comprises performing an XOR operation on the values of the second portion of data and the third portion of data to produce the fourth portion of data.

In Example 10, the subject matter of any one or more of Examples 1-9 wherein the memory device is a NAND memory device.

Example 11 is a memory device comprising: a multi-die memory array; a memory controller, configured to perform operations comprising: simultaneously causing a first portion of data to be read from a first memory die and a second portion of data to be read from a second memory die and a third portion of data to be read from a third memory die, the third portion of data including parity data for data including the second portion of data and a fourth portion of data stored in the first memory die; and reconstituting the fourth portion of data stored in the first memory die using the second portion of data and the parity data in parallel with reading a fifth portion of data being read from a selected memory die.

In Example 12, the subject matter of Example 12 wherein: the first portion of data is part of a first stripe of data stored in the multi-die memory array of the memory device; the second, third, and fourth portions of data are part of a second stripe of data stored in the multi-die array of the memory device; and the fifth portion of data is part of a third stripe of data stored in the multi-die array of the memory device.

In Example 13, the subject matter of Example 12 wherein the fifth portion of data is read from the first memory device.

In Example 14, the subject matter of any one or more of Examples 12-13 wherein the memory dies of the multi-die array are multi-plane memory dies, and wherein each of the first, second, third, fourth, and fifth portions of data is in a respective plane of a respective die.

In Example 15, the subject matter of any one or more of Examples 11-14 optionally include P) translation table entries.

In Example 16, the subject matter of Example 15 wherein the operations further comprise: receiving a host command; determining that a L2P cache in a volatile memory of the memory device does not have an entry for a logical address included in the host command; and wherein causing the first portion, second portion, third portion, and fifth portions to be read is performed responsive to determining that the L2P cache in the volatile memory of the memory device does not have the entry for the logical address included in the host command.

In Example 17, the subject matter of Example 16 wherein the operations further comprise: translating the logical address included in the host command to a physical address using at least part of the first portion, second portion, third portion, fourth portion, or fifth portions; and causing execution of the host command on the physical address.

In Example 18, the subject matter of any one or more of Examples 15-17 wherein the operations further comprise: receiving a host command; determining that a L2P cache in a volatile memory of the memory device does not have an entry for a logical address included in the host command; determining that reading the entry for the logical address included in the host command includes reading at least two portions of data stored in a same die; and wherein the causing the first portion, second portion, third portion, and fifth portions to be read, and reconstituting the fourth portion is performed responsive to determining that reading the entry for the logical address included in the host command includes reading at least two portions of data stored in the same die.

In Example 19, the subject matter of any one or more of Examples 11-18 wherein the operations of reconstituting the fourth portion of data comprises performing an XOR operation on the values of the second portion of data and the third portion of data to produce the fourth portion of data.

In Example 20, the subject matter of any one or more of Examples 11-19 wherein the memory device is a NAND memory device.

Example 21 is a machine-readable medium, storing instructions, which when executed by a controller of a memory device, cause the controller to perform operations comprising: simultaneously causing a first portion of data to be read from a first memory die and a second portion of data to be read from a second memory die and a third portion of data to be read from a third memory die, the third portion of data including parity data; and reconstituting a fourth portion of data stored in the first memory die using the second portion of data and the parity data in parallel with a fifth portion of data being read from the first memory die.

In Example 22, the subject matter of Example 21 optionally includes P) translation table entries.

In Example 23, the subject matter of Example 22 wherein the operations further comprise: receiving a host command; determining that a L2P cache in a volatile memory of the memory device does not have an entry for a logical address included in the host command; and wherein causing the first portion, second portion, third portion, and fifth portions to be read is performed responsive to determining that the L2P cache in the volatile memory of the memory device does not have the entry for the logical address included in the host command.

In Example 24, the subject matter of Example 23 wherein the operations further comprise: translating the logical address included in the host command to a physical address using at least part of the first portion, second portion, third portion, fourth portion, or fifth portions; and causing execution of the host command on the physical address.

In Example 25, the subject matter of any one or more of Examples 22-24 wherein the operations further comprise: receiving a host command; determining that a L2P cache in a volatile memory of the memory device does not have an entry for a logical address included in the host command; determining that reading the entry for the logical address included in the host command includes reading at least two portions of data stored in a same die; and wherein the causing the first portion, second portion, third portion, and fifth portions to be read, and reconstituting the fourth portion is performed responsive to determining that reading the entry for the logical address included in the host command includes reading at least two portions of data stored in the same die.

In Example 26, the subject matter of any one or more of Examples 21-25 wherein the operations of reconstituting the fourth portion of data comprises performing an XOR operation on the values of the second portion of data and the third portion of data to produce the fourth portion of data.

Example 27 is at least one machine-readable medium including instructions that, when executed by processing circuitry, cause the processing circuitry to perform operations to implement of any of the methods Examples 1-10.

Example 28 is an apparatus structured and configured to implement of any of the methods of Examples 1-10.

Example 29 is a system structured and configured to implement of any of methods or apparatus of any of Examples 1-20.

Example 30 is a method to implement of any of the operations performed by any of the memory devices of Examples 11-20.

The invention claimed is:

1. A method of reading data from a memory device comprising:
   simultaneously causing a first portion of data to be read from a first memory die and a second portion of data to be read from a second memory die and a third portion of data to be read from a third memory die, the third portion of data including parity data for data including the second portion of data and a fourth portion of data stored in the first memory die; and
   reconstituting the fourth portion of data stored in the first memory die using the second portion of data and the parity data in parallel with reading a fifth portion of data from a selected memory die.

2. The method of claim 1, wherein:
   the first portion of data is part of a first stripe of data stored in a multi-die array of the memory device;
   the second, third, and fourth portions of data are part of a second stripe of data stored in the multi-die array of the memory device; and
   the fifth portion of data is part of a third stripe of data stored in the mufti-die array of the memory device.

3. The method of claim 2, wherein the fifth portion of data is read from the first memory die.

4. The method of claim 2, wherein the memory dies of the multi-die array are multi-plane dies, and wherein each of the first, second, third, fourth, and fifth portions of data is in a respective plane of a respective die.

5. The method of claim 1, wherein the first, second, third, fourth, and fifth portions of data are Logical to Physical (L2P) translation table entries.

6. The method of claim 5, further comprising:
   receiving a host command;
   determining that a L2P cache in a volatile memory of the memory device does not have an entry for a logical address included in the host command; and
   wherein causing the first portion, second portion, third portion, and fifth portions to be read is performed responsive to determining that the L2P cache in the volatile memory of the memory device does not have the entry for the logical address included in the host command.

7. The method of claim 6, further comprising:
   translating the logical address included in the host command to a physical address using at least part of the first portion, second portion, third portion, fourth portion, or fifth portions; and
   causing execution of the host command on the physical address.

8. The method of claim 5, further comprising:
   receiving a host command;
   determining that a L2P cache in a volatile memory of the memory device does not have an entry for a logical address included in the host command;
   determining that reading the entry for the logical address included in the host command includes reading at least two portions of data stored in a same die; and
   wherein the causing the first portion, second portion, third portion, and fifth portions to be read, and reconstituting the fourth portion is performed responsive to determining that reading the entry for the logical address included in the host command includes reading at least two portions of data stored in the same die.

9. The method of claim 1, wherein reconstituting the fourth portion of data comprises performing an XOR operation on values of the second portion of data and the third portion of data to produce the fourth portion of data.

10. The method of claim 1, wherein the memory device is a NAND memory device.

11. A memory device comprising:
    a multi-die memory array;
    a memory controller comprising one or more processors, and configured to perform operations comprising:
    simultaneously causing a first portion of data to be read from a first memory die and a second portion of data to be read from a second memory die and a third portion of data to be read from a third memory die, the third portion of data including parity data for data including the second portion of data and a fourth portion of data stored in the first memory die; and
    reconstituting the fourth portion of data stored in the first memory die using the second portion of data and the parity data of the third portion of data in parallel with reading a fifth portion of data being read from a selected memory die.

12. The memory device of claim 11, wherein:
    the first portion of data is part of a first stripe of data stored in the multi-die memory array of the memory device;
    the second, third, and fourth portions of data are part of a second stripe of data stored in the multi-die array of the memory device; and
    the fifth portion of data is part of a third stripe of data stored in the mufti-die array of the memory device.

13. The memory device of claim 12, wherein the fifth portion of data is read from the first memory die.

14. The memory device of claim 12, wherein the memory dies of the multi-die array are multi-plane memory dies, and wherein each of the first, second, third, fourth, and fifth portions of data is in a respective plane of a respective memory die.

15. The memory device of claim 11, wherein the first, second, third, fourth, and fifth portions of data are Logical to Physical (L2P) translation table entries.

16. The memory device of claim 15, wherein the operations further comprise:
    receiving a host command;
    determining that a L2P cache in a volatile memory of the memory device does not have an entry for a logical address included in the host command; and
    wherein causing the first portion, second portion, third portion, and fifth portions to be read is performed responsive to determining that the L2P cache in the volatile memory of the memory device does not have the entry for the logical address included in the host command.

17. The memory device of claim 16, wherein the operations further comprise:
    translating the logical address included in the host command to a physical address using at least part of the first portion, second portion, third portion, fourth portion, or fifth portions; and causing execution of the host command on the physical address.

18. The memory device of claim 15, wherein the operations further comprise:
receiving a host command;
determining that a L2P cache in a volatile memory of the memory device does not have an entry for a logical address included in the host command;
determining that reading the entry for the logical address included in the host command includes reading at least two portions of data stored in a same die; and
wherein the causing the first portion, second portion, third portion, and fifth portions to be read, and reconstituting the fourth portion is performed responsive to determining that reading the entry for the logical address included in the host command includes reading at least two portions of data stored in the same die.

19. The memory device of claim 11, wherein the operations of reconstituting the fourth portion of data comprises performing an XOR operation on values of the second portion of data and the third portion of data to produce the fourth portion of data.

20. The memory device of claim 11, wherein the memory device is a NAND memory device.

21. A non-transitory machine-readable medium, storing instructions, which when executed by a controller of a memory device, cause the controller to perform operations comprising:
simultaneously causing a first portion of data to be read from a first memory die and a second portion of data to be read from a second memory die and a third portion of data to be read from a third memory die, the third portion of data including parity data; and
reconstituting a fourth portion of data stored in the first memory die using the second portion of data and the parity data in parallel with a fifth portion of data being read from the first memory die.

22. The non-transitory machine-readable medium of claim 21, wherein the first, second, third, fourth, and fifth portions of data are Logical to Physical (L2P) translation table entries; and wherein the operations further comprise:
receiving a host command;
determining that a L2P cache in a volatile memory of the memory device does not have an entry for a logical address included in the host command; and
wherein causing the first portion, second portion, third portion, and fifth portions to be read is performed responsive to determining that the L2P cache in the volatile memory of the memory device does not have the entry for the logical address included in the host command.

* * * * *